United States Patent
Saeed et al.

(10) Patent No.: US 8,132,044 B1
(45) Date of Patent: Mar. 6, 2012

(54) CONCURRENT AND INCREMENTAL REPAIR OF A FAILED COMPONENT IN AN OBJECT BASED STORAGE SYSTEM FOR HIGH AVAILABILITY

(75) Inventors: Tariq Saeed, Sunnyvale, CA (US); Craig K. Harmer, San Francisco, CA (US); George Mathew, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 76 days.

(21) Appl. No.: 12/701,216

(22) Filed: Feb. 5, 2010

(51) Int. Cl.
*G06F 11/00* (2006.01)
(52) U.S. Cl. ........................................ 714/6.1
(58) Field of Classification Search ........... 714/6.1–6.32
See application file for complete search history.

(56) References Cited

U.S. PATENT DOCUMENTS

| | | | | |
|---|---|---|---|---|
| 5,996,089 A * | 11/1999 | Mann et al. | ................... | 714/6.31 |
| 6,961,868 B2 * | 11/2005 | Tormasov et al. | ............. | 714/6.1 |
| 6,985,995 B2 * | 1/2006 | Holland et al. | ................ | 711/114 |
| 7,386,757 B2 * | 6/2008 | Lindenstruth et al. | ......... | 714/6.1 |
| 7,617,259 B1 * | 11/2009 | Muth et al. | ............................. | 1/1 |
| 7,823,009 B1 * | 10/2010 | Tormasov et al. | ........... | 714/6.12 |
| 2001/0044879 A1 * | 11/2001 | Moulton et al. | ............... | 711/114 |
| 2005/0022052 A1 * | 1/2005 | Moulton et al. | ................... | 714/6 |
| 2006/0031287 A1 * | 2/2006 | Ulrich et al. | ................... | 709/203 |
| 2006/0107096 A1 * | 5/2006 | Findleton et al. | ................ | 714/6 |

* cited by examiner

*Primary Examiner* — Bryce Bonzo
(74) *Attorney, Agent, or Firm* — Rory D. Rankin; Meyertons, Hood, Kivlin, Kowert & Goetzel

(57) ABSTRACT

Systems and methods for repairing a failed component within a data storage subsystem without interruption of service. A client device is coupled to a data storage cluster comprising a plurality of data storage locations addressable as rows and columns in an array. Each column of the array comprising a separate computer interconnected to other columns via a network. After both detecting a failure of a first column in the array and detecting a predetermined time threshold has elapsed, a predetermined reconstruction column coordinates reconstructing data storage locations within the reconstruction column. For a second row in the array, a predetermined coordinating column coordinates the execution of a received memory access requests from the client corresponding to the second row. In this manner, a column coming back online after a failure is able to repair without halting the servicing of read and write requests.

18 Claims, 10 Drawing Sheets

CONCURRENT AND INCREMENTAL REPAIR OF A FAILED COMPONENT IN AN OBJECT BASED STORAGE SYSTEM FOR HIGH AVAILABILITY

FIELD OF THE INVENTION

This invention relates to computer systems and, more particularly, to repairing a failed component within data storage subsystems without interruption of service.

DESCRIPTION OF THE RELATED ART

Computer systems frequently include data storage subsystems for storing data. In particular, computer systems that include multiple clients interconnected by a network increasingly share one or more data storage subsystems via a network. The data storage subsystems may include or be further coupled to storage consisting of one or more disk storage devices, tape drives, or other storage media. A computer system may also include one or more servers in which metadata associated with the contents of the included storage devices is maintained.

Data storage subsystems may store data with some redundancy to allow for recovery from storage errors. There are a variety of techniques to store data redundantly, including erasure coding techniques such as Reed-Solomon encodings and RAID (Redundant Array of Independent Disks) using a variety of layouts, such as RAID-1, RAID-5, or RAID-6. These RAID layouts may be implemented within an object-based file system in which each independent storage device is treated as a disk, and each client device may convey data to the storage devices via a network.

Unfortunately, some way of arbitrating write access requests from multiple clients may be needed to avoid introducing inconsistencies into the redundant data. One approach may include performing all of the functions involved in sequencing writes using a lock mechanism. For example, in the case of RAID-5 or RAID-6, these functions may include reading old data and old parity, computing new parity, logging the new data and new parity, and writing the new data and new parity to their respective storage locations that together constitute a part of or the whole of a row in the RAID layout. In addition, in one embodiment information may be retrieved from a Meta Data Server (MDS) for each write to an individual location in the RAID layout. In another embodiment, the MDS may coordinate each write to an individual location in the RAID layout. The performance of these functions increases write latency and adds complexity and significant computational and storage overhead to each client.

Taking RAID-5 for example, user data may be divided into fixed size units called stripe units. Each stripe may be stored on a separate disk. Generally speaking, all disks are physically co-located. The number of such devices may be configurable and once chosen may remain fixed. Each disk may generally be referred to as a column. Data may then be striped in rows across these columns. In each row, one column may hold an error detecting and/or correcting code such as a parity of the remaining columns. The column holding the parity may rotate with each successive row. It is customary to speak of a RAID-5 layout as RAID n+1, since data is in n columns and parity is in 1 column. If any computer, or column, fails, lost data may be reconstructed by summing the remaining columns such as with a binary bit-wise exclusive-or function. Typically, a RAID-5 layout rebuilds, or resynchronizes, data of a previously offline column when that column comes back online. However, during the rebuild process, the now online column having data reconstructed is not available for read and write operations since the data is constantly being changed by new write operations. After the repair, the component is once again made available. Because the column is unavailable during reconstruction, I/O performance may suffer.

In view of the above, systems and methods for repairing a failed component within data storage subsystems without interruption of service are desired.

SUMMARY OF THE INVENTION

Various embodiments of a computer system and methods are disclosed.

In one embodiment, one or more client devices are coupled to a data storage cluster. The data storage cluster comprises a plurality of data storage locations addressable as rows and columns in an array. In one embodiment, each column of the array comprises a separate computer interconnected to other columns via a network. In another embodiment, the data storage cluster comprises two or more computers interconnected to each other via a network, wherein each computer comprises two or more columns of the array. Subsequent to detecting a failure of a first column in the array, a second column may be designated as a temporary replacement for the first column. While the data storage cluster continues to service the received read and write requests, the second column may initiate a background reconstruction of data that was stored in the first column. This reconstruction may also reflect updates from write requests to the first column received after the detected failure. In one embodiment, the array comprises a redundant array of independent disks (RAID) 5 layout. The second column is a temporary column for temporarily replacing the failed first column, which may no longer be online. Any row may have a multiple-reader-single-writer, or simply a reader-writer, lock asserted. This type of lock may also be referred to as a shared/exclusive lock. Such a lock holds the entire row in exclusive mode during a write operation and holds the entire row in shared mode during a read operation. A particular row with one or more data storage locations being reconstructed in the temporary column may have a reader-writer lock asserted. A parity column may receive the reconstruction request and assert such a lock.

In various embodiments, after detecting a given amount of time has elapsed after failure of a column, the temporary column may be designated as a permanent replacement for the failed column. In some embodiments, the background reconstruction process may not begin until the temporary column is assigned as a permanent replacement. Additionally, reconstruction of data may be performed concurrent with the servicing of read and/or write requests received from a software application executing on a client.

Also contemplated are embodiments wherein a coordinating column, which may be the parity column within a RAID-5 layout, may be further able to assert a reader-writer lock on a row comprising the storage location being reconstructed. With a reader-writer lock, the coordinating column may perform a read operation on each column of the locked row, except for the reconstruction column, and postpone performance of a read operation on the reconstruction column until reconstruction is complete. In addition, with a reader-writer lock, the coordinating column may postpone execution of a write operation on any column of the locked row until completion of the reconstruction. In addition, the write operation may be postponed via a reader-writer lock by any prior read operations that occur after reconstruction has completed. Prior to the completion of the reconstruction, the coordinating column may also coordinate reconstructing data in a data storage location targeted by a read/write request. In some embodiments, the column doing reconstruction may generate one or more background threads to perform the reconstruction. Therefore, after a failure of a column, another column may be brought online and have data reconstructed using background threads without halting the servicing of client read and write requests.

These and other embodiments will become apparent upon consideration of the following description and accompanying drawings.

Figure 1:
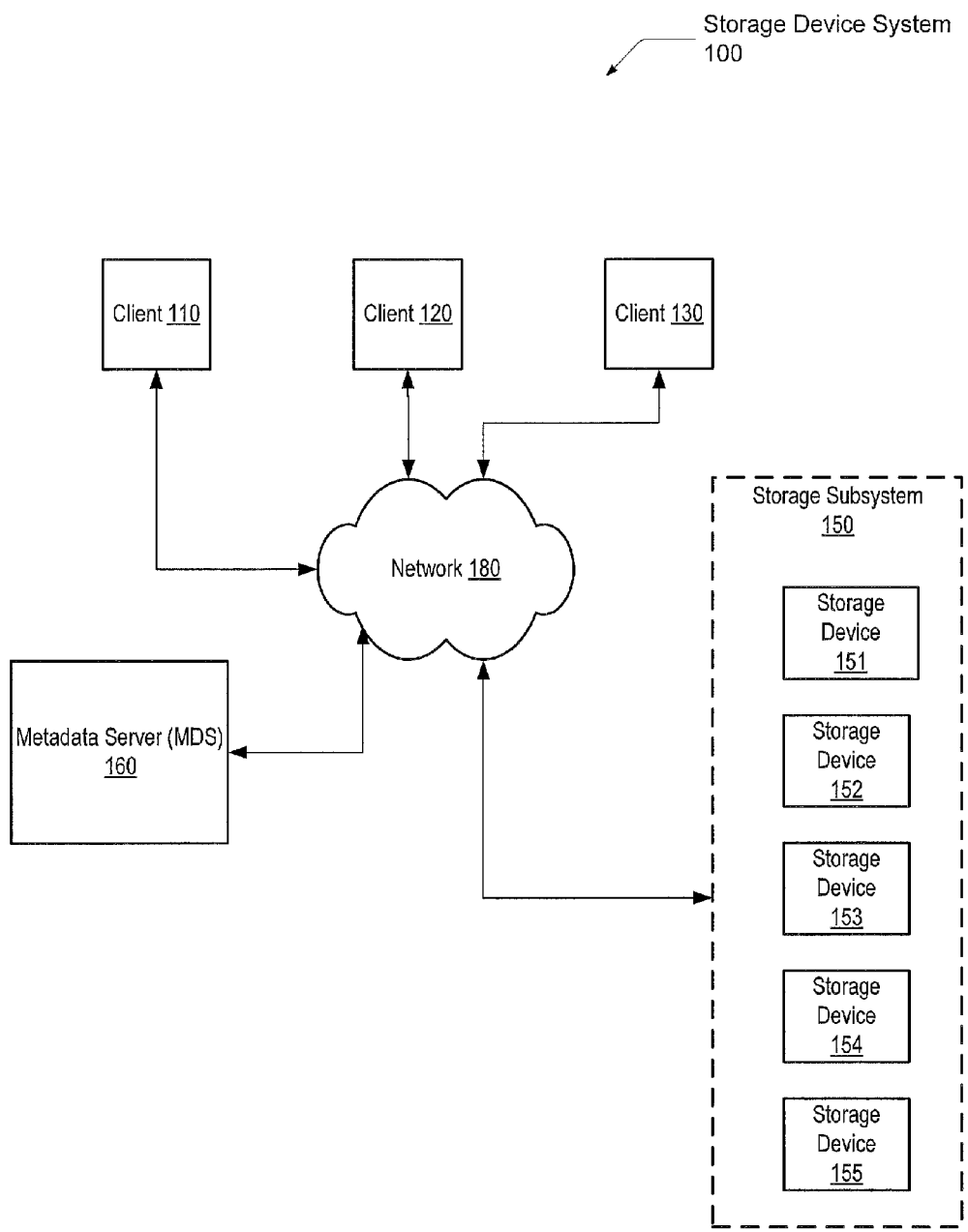
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, signals, computer program instruction, and techniques have not been shown in detail to avoid obscuring the present invention.

FIG. 1 illustrates one embodiment of a computer system 100. As shown, system 100 includes clients 110, 120, and 130, a storage subsystem 150, and a metadata server (MDS) 160 interconnected through a network 180. Clients 110, 120, and 130 are representative of any number of stationary or mobile computers such as desktop PCs, workstations, laptops, handheld computers, blade servers, etc. Although system 100 is described as including client and servers, in alternative embodiments the functions performed by clients and servers may be performed by peers in a peer-to-peer configuration or by a combination of clients, servers, and peers.

In alternative embodiments, the number and type of clients, servers, and storage devices is not limited to those shown in FIG. 1. Almost any number and combination of servers, desktop, and mobile clients may be interconnected in system 100 via various combinations of modem banks, direct LAN connections, wireless connections, WAN links, etc. Also, at various times one or more clients may operate offline. In addition, during operation, individual client connection types may change as mobile users travel from place to place connecting, disconnecting, and reconnecting to system 100.

Within system 100, it may be desired to store data associated with any of clients 110, 120, and 130 within storage subsystem 150. Subsystem 150 may include individual storage devices 151-155. Storage devices 151-155 may be any of a variety of devices such as hard disks, server blades, peer-to-peer storage servers, or specialized devices, and may include a variety of memory devices such as RAM, Flash RAM, MEMS (MicroElectroMechanical Systems) storage, battery-backed RAM, and/or non-volatile RAM (NVRAM), etc. In one embodiment, each storage device may be a separate computer. Then storage subsystem 150 may comprise separate individual computers 151-155. In another embodiment, each separate computer may be interconnected with other separate computers via network 180. Therefore, rather than subsystem 150 having an interface with network 180, each separate computer 151-155 may have an interface with network 180 in order to communicate with clients 110-130, other computers within subsystem 150, or other. In one embodiment, each separate computer 151-155 may execute software applications, similar to clients 110-130, wherein the applications utilize data from each separate computer 151-155.

Client data may be stored within storage subsystem 150 in one of a variety of well-known layouts, such as RAID-1, RAID-DP, RAID-5, RAID-6, an erasure-coded data representation scheme, etc., in which the reliability of storage may be enhanced by redundancy and/or error correction capabilities. In one embodiment, metadata associated with the layout of data stored in storage subsystem 150 may be stored on storage devices 151-155. In another embodiment, metadata associated with the layout of data stored in storage subsystem 150 may be stored in MDS 160. A client may retrieve metadata from MDS 160 in order to identify a desired data storage location within storage subsystem 150. In alternative embodiments, the functions of MDS 160 may be performed by any of a variety of components such as a volume configuration daemon, one of the storage devices 151-155, or other storage management processes or servers depending on the type and layout of storage devices in subsystem 150.

In the following discussion, data may be stored in stripe units of a given size that depends on the capacity of individual storage device locations. These stripe units may be data objects, data portions, chunks, or any other segment of data suited to the individual storage devices. However, from the client view, data stripe units may be of a different size. For example, a client may convey data to a storage subsystem in stripe units of a size sufficient to fill a row across a number of storage devices arranged in an array. A client may also convey data in a size smaller than a stripe unit. A variety of stripe layouts are possible and contemplated, some of which are described in further detail below.

For a given row within storage subsystem 150, one of the storage devices may be designated as a coordinating storage device. In some embodiments, data may be stored without parity and the coordinating storage device in each row may coordinate storage of individual stripe units in the other storage devices in the row. In another embodiment involving redundant layouts, the coordinating storage device may coordinate storage of data as well as coordinating parity computation. In yet another embodiment, a separate computer may comprise a storage device, wherein the computers, or columns, are interconnected via a public network. One computer may be designated as a coordinating column for a particular row. This coordinating column may coordinate storage of data within other columns of the particular row and coordinate parity computation. Numerous such alternatives are possible and are contemplated.

Figure 2:
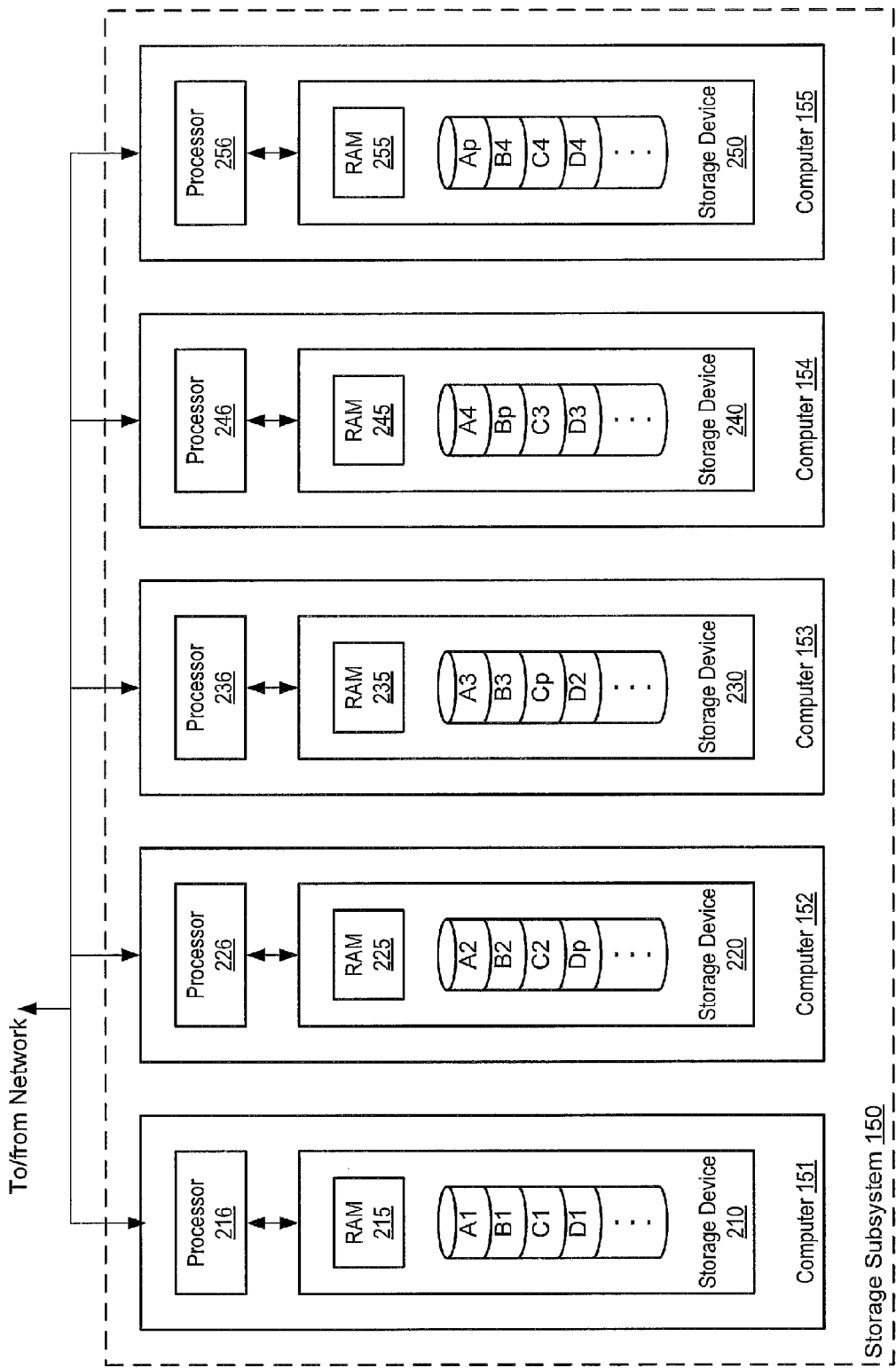
FIG. 2 is a generalized block diagram of one embodiment of a RAID-5 data storage subsystem.

Turning now to FIG. 2, a generalized block diagram of one embodiment of storage subsystem 150 is shown. In the illustrated embodiment, storage subsystem 150 may include separate computers 151-155. These computers may include a processors 216, 226, 236, 246, and 256. Each processor may comprise one or more processor cores, or cores. Each processor core may utilize conventional processor design techniques such as complex branch prediction schemes, out-of-order execution, and register renaming techniques. Each core may execute one or more threads. Each core 102 may include circuitry for executing instructions according to a predefined instruction set. For example, the SPARC instruction set architecture (ISA) may be selected. Alternatively, the x86, Alpha, PowerPC, or any other instruction set architecture may be selected. Generally, processor core 102 may access a cache memory subsystem for data and instructions. Each core may contain its own level 1 (L1) and level 2 (L2) caches in order to reduce memory latency. These cache memories may be integrated within respective processor cores. Alternatively, these cache memories may be coupled to processor cores in a backside cache configuration or an inline configuration, as desired. The L1 cache may be located nearer a processor core both physically and within the cache memory hierarchy.

The separate computers or servers 151-155 may also include storage devices 210, 220, 230, 240, and 250, arranged in a RAID-5 layout. Each of storage devices 210, 220, 230, 240, and 250 includes a corresponding one of a set of temporary storage devices 215, 225, 235, 245, and 255 such as random access memory (RAM). In one embodiment, storage devices 215, 225, 235, 245, and 255 may include non-volatile RAM (NVRAM). Data may be stored in stripe units striped in rows across the storage devices.

In various RAID-5 embodiments, there may be a parity storage device and at least two data storage devices in each row, depending on the number of storage devices in the layout. For example, in the illustrated embodiment, a row may be defined as five stripe units each stored on one of storage devices 210, 220, 230, 240, and 250. Data may be striped across a portion of a row, a full row, or more than one row. In one embodiment, each row may include four data stripe units and a parity stripe unit. More particularly, the first row in the illustrated embodiment may include data stripe units A1, A2, A3, and A4 and parity stripe unit Ap stored in storage devices 210, 220, 230, 240, and 250, respectively. The second row may include data stripe units B1, B2, B3, and B4 and parity stripe unit Bp. Unlike the first row in which the parity stripe unit Ap was stored in storage device 250, the parity stripe unit Bp may be stored in storage device 240, while the data stripe units B1, B2, B3, and B4 may be stored in storage devices 210, 220, 230, and 250, respectively. The location of the parity stripe unit may be rotated among the storage devices on each successive row such as rows C and D, etc.

During operation, a client may write data to a given row as if writing to a RAID-0 layout. More specifically, the client may be told that the data is striped such that for each RAID-5 row, the entire row is stored in the storage device holding the parity stripe unit that is designated for that row and the stripe size is equal to the combined size of the other, non-parity stripe units in the row. The client may then send data for the entire row to the parity storage device. The parity storage device may then forward the one or more portions of the data to the component data storage devices in the given row according to a process that will be described in more detail below. Each storage device may store the parity or data in its associated RAM until the new parity has been calculated, at which time the write operation may be committed and the data and parity may be transferred from RAM to the associated stripe unit locations. The storage subsystem may return a write completion message to the client after the data and parity stripe units are stored in RAM but before the data and parity are transferred from RAM to the associated stripe unit locations, minimizing write latency. A dataset that is larger than the capacity of a single row may be written through a series of write operations, each having a width of one row or less and each being addressed to the corresponding parity storage device in its respective row.

Read operations may be handled in a similar manner. For example, a read request may also be sent from a client to the parity storage device in a given row. The parity storage device may convey a corresponding read request to each storage device in the layout and receive in return a portion of the requested data. The parity storage device may then assemble the data and return it to the requesting client. If one or more portions of the data are located on a storage device that has failed, the parity storage device may retrieve the data from a sufficient number of the remaining storage devices making up the row and then reconstruct the missing data using the available data and parity.

Figure 3:
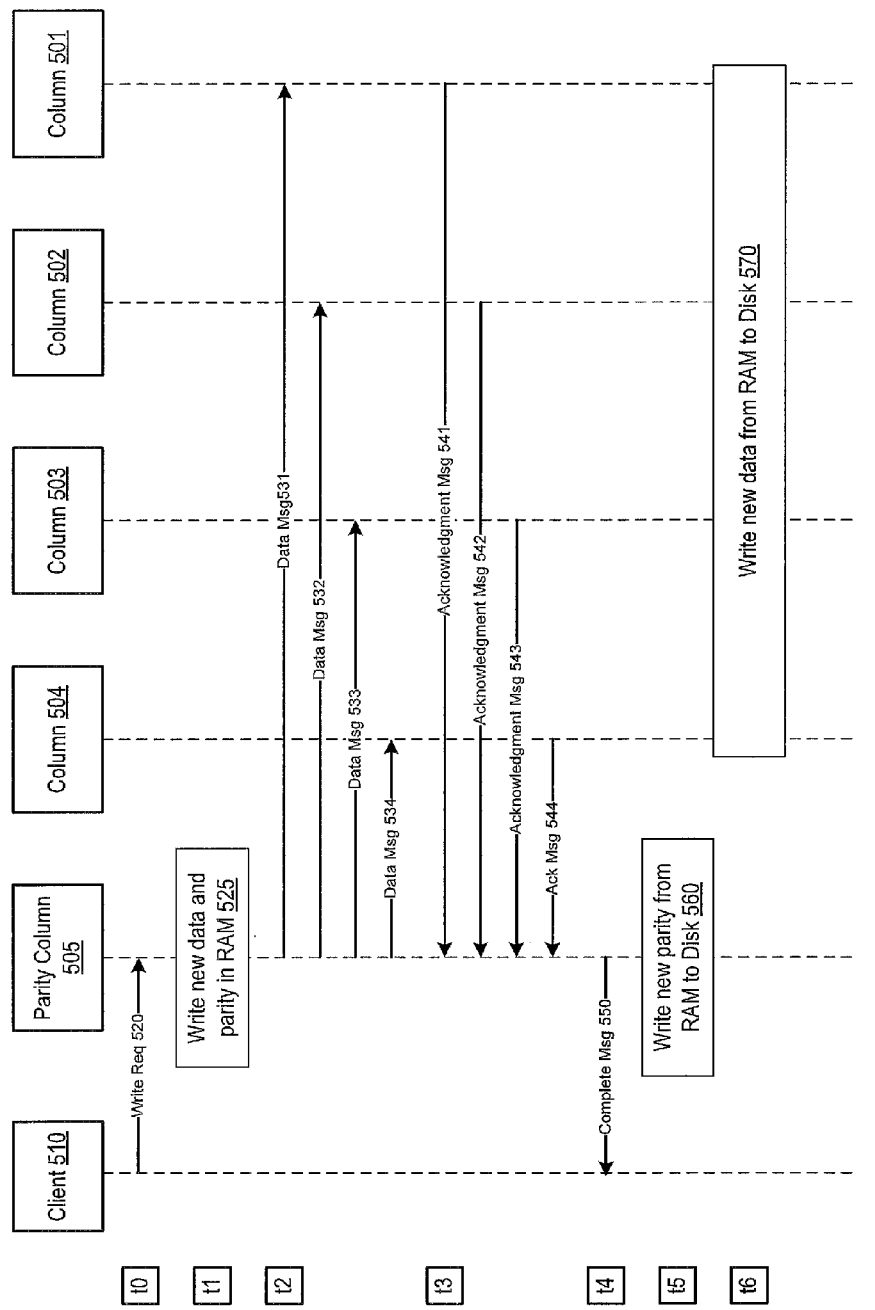
FIG. 3 is a sequence diagram illustrating one embodiment of a write transaction between a client and a row in a RAID-5 layout.

FIG. 3 is a sequence diagram illustrating one embodiment of a write transaction between a client and a row in a RAID-5 layout. In the illustrated embodiment, a client 510 is shown writing data to a row consisting of columns 501-504 and parity column 505. Here, the data storage devices are referred to as columns 501-504 and the parity storage device is referred to as parity column 505. An array is formed with rows striped across the columns. Data storage locations within this array may be addressable by corresponding rows and columns 501-504. As described earlier, in one embodiment, each column 501-504 may be a separate computer interconnected with other columns of the array via a network.

In this example, the data size is assumed to be equal to the capacity of one row. Although for other write sequence examples, the data size may be equal to the capacity of one column, or storage device. In yet other examples, the data size may be equal to the capacity of a subdivision of one column, or storage device, such as a single byte. At time t0, client 510 may send data to parity column 505 in message 520 including data to be stored in each of columns 501-504. Client 510 need not be aware of the individual components of the row. Rather, client 510 may obtain the layout of the data storage including the location of parity column 505 and the size of the row from a metadata server. After parity column 505 receives the data, at time t1, parity column 505 may calculate a new parity stripe unit and store it and/or the data in its associated temporary storage device (block 525). At time t2, parity column 505 may begin a process of forwarding a portion of data to each of columns 501-504 in messages 531-534, respectively. Each of columns 501-504 may store received data in its associated temporary storage device.

At time t3, parity column 505 may begin receiving acknowledgements from each of columns 501-504 in messages 541-544, respectively. Once all of the acknowledgements have been received, at time t4, parity column 505 may send write complete message 550 to client 510. It is noted that write complete message 550 may not be sent to the client until the new data has been received and acknowledged by the data storage devices. This ensures that the data is redundantly stored and can be recovered in the event of the failure of any single device. Subsequently, at time t5, parity column 505 may calculate the new parity values based on the new data in it's associated temporary storage device and write it to its parity stripe unit location (block 560) or, if the new parity is already stored in its associated temporary storage device, write the new parity values from its associated temporary storage device to its parity stripe unit location (block 560). At time t6, each of columns 501-504 may write data from its associated temporary storage device to its data stripe unit location, completing the write transaction (block 570).

A number of error recovery scenarios will next be described. In the case of a power failure or other temporary interruption of the storage devices that occurs between time t1 and time t2, the write may be discarded. Since the transfer of the new data and/or new parity to the temporary storage devices was incomplete, the partial data may be discarded once power is restored or the interruption is cured. In the case of a power failure or other temporary interruption after time t2, processing may continue after the power is restored and the remaining steps of the algorithm may be carried out as if no failure had occurred.

In the case of failure of a storage device other than the parity storage device, the parity storage device may detect the failure and send an error message to the client in lieu of a read or write completion message. In response, the client may contact the MDS to report the error. Upon receiving an error message from the client, the MDS may select a new storage device to replace the failed device and cause the contents of the stripe to be rebuilt based on the data stored in the remaining storage devices. If the device failure occurs before all of the devices in the row have received and stored their respective portions of data, a complete copy of the write data may be obtained from the parity storage device to complete the write operation.

In the case of a failure of the parity storage device, the MDS may recognize the failure of the parity storage device via conventional techniques such as polling, etc., or it may learn of the failure from a client whose read or write (to the parity device) failed, and select a new storage device to replace it. The new parity storage device may recalculate parity values by reading the data from the other storage devices and storing the resulting values in the new storage location.

Figure 4:
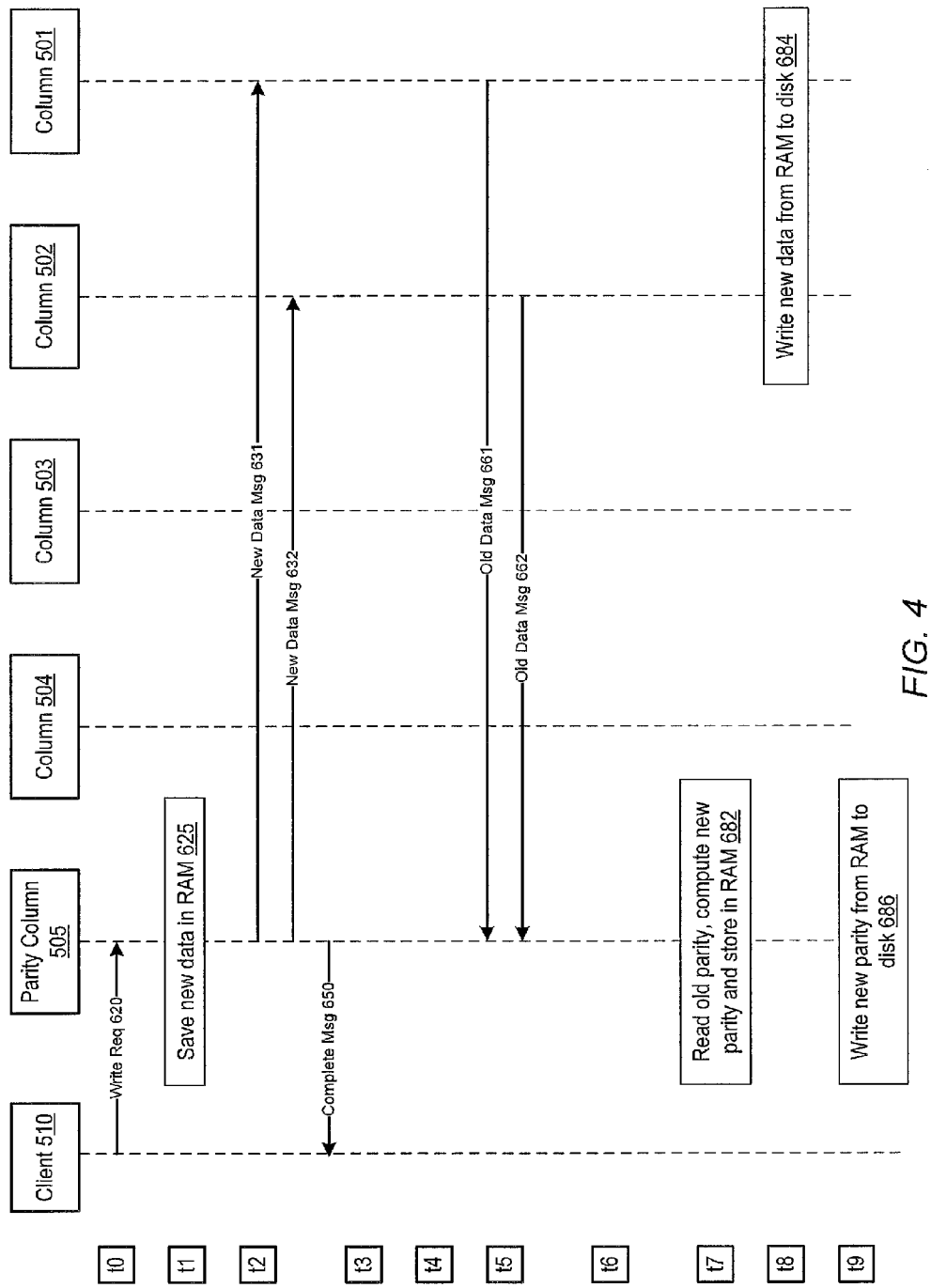
FIG. 4 is a sequence diagram illustrating one embodiment of a write transaction between a client and a partial row in a RAID-5 layout.

FIG. 4 is a sequence diagram illustrating one embodiment of a write transaction between a client and a partial row in a RAID-5 layout. In the illustrated embodiment, a client 510 is shown writing data to a row consisting of columns 501-504 and parity column 505. Here again, the data storage devices are referred to as columns 501-504 and the parity storage device is referred to as parity column 505. An array is formed with rows striped across the columns. Data storage locations within this array may be addressable by corresponding rows and columns 501-504. As described earlier, in one embodiment, each column 501-504 may be a separate computer interconnected with other columns of the array via a network.

In this example, the data size is assumed to be less than the capacity of one row. At time t0, client 510 may send data to parity column 505 in message 620 including data to be stored in each of columns 501 and 502. Client 510 may not be aware of the individual components of the row. Rather, client 510 may obtain or be told the layout of the data storage including the location of parity column 505 and the size of the data stripe unit needed to store the data from a metadata server. After parity column 505 receives the data, at time t1, parity column 505 may store the data in its associated temporary storage device (block 625).

At time t2, parity column 505 may begin a process of forwarding a portion of the data to each of columns 501 and 502 in messages 631 and 632, respectively. Each of columns 501 and 502 may later store received data in its associated temporary storage device. In various embodiments, each of columns 501 and 502 may or may not send an acknowledgment message to the parity column 505 acknowledging receipt of the messages 631 and 632. For example, in one embodiment columns 501 and 502 may receive and store data corresponding to messages 631 and 632 in a temporary buffer (e.g., NVRAM) before it is stored to disk. Once the data is safely stored in the buffer, an acknowledgement could be returned to the parity column 505. In the embodiment shown, parity column 505 may send a write complete message 650 (corresponding to write request 620) to client 510. Columns 501 and 502 may have not yet stored to disk the new data corresponding to write request message 620, and parity column 505 is already conveying the write complete message 650 to client 510. By being preemptive with the write complete status by conveying message 650 early, the parity column 505 may have increased the performance of the application running on the client 510. Client 510 may now continue execution of an application depending on the write complete message 650. New read and write request messages may be sent from the client 510 to parity column 505.

Each of columns 501 and 502 may later store to disk the received data in its associated temporary storage device, such as NVRAM. For example, for a corresponding row of the write request message 620, columns 501-504 may be storing old data represented simply as A, B, C, and D respectively. A current parity value may be stored in a corresponding row of parity column 505. This value may be represented simply as (A+B+C+D), wherein the symbol "+" indicates a bit-wise binary exclusive-or operation. New data sent to columns 501 and 502 via messages 631 and 632 may be represented simply as A' and B'. Subsequently, each of data columns 501 and 502 may send a copy of the old data that was stored in its associated data storage location to parity column 505 in messages 661 and 662, respectively. Although these messages are shown to be conveyed at time t5 and at a close proximity in time with one another, the actual sending of messages 661 and 662 may occur whenever it is convenient for columns 501 and 502. Both the early conveyance of the write complete message 650 and the allowance of messages 661 and 662 to be conveyed when convenient for columns 501 and 502 provide an asynchronous write operation for the array. This asynchronous write operation may add flexibility to the array, which may permit subsequent operations to occur sooner than an implementation with a synchronous write operation.

After receiving messages 661 and 662, shown for illustrative purposes at time t6, the parity column 505 may or may not send acknowledgment signals or messages to each of columns 501 and 502. Subsequently, at time t7, parity column 505 may use old data received from columns 501 and 502 and new data received from client 510 to compute new parity values, storing the results in its associated temporary storage device (block 682). For example, parity column 505 may compute a partial parity value for column 501 as (A'+A) and a partial parity value for column 502 as (B'+B). Then a new parity value may be computed with these partial parity vales and the stored current parity value, such as (A'+A)+(B'+B)+ (A+B+C+D)=A'+B'+C+D. It is noted no data values were sent to or received from the columns 503 and 504 for this write request.

At time t8, each of data columns 501 and 502 may write data from its associated temporary storage device to its data storage location (block 684). Alternatively, columns 501 and 502 may have performed this write to data store locations immediately after sending respective old data values to parity column 505. At time t9, parity column 505 may write the new parity values from its associated temporary storage device to its parity data storage location, completing the write transaction (block 686).

Figure 5:
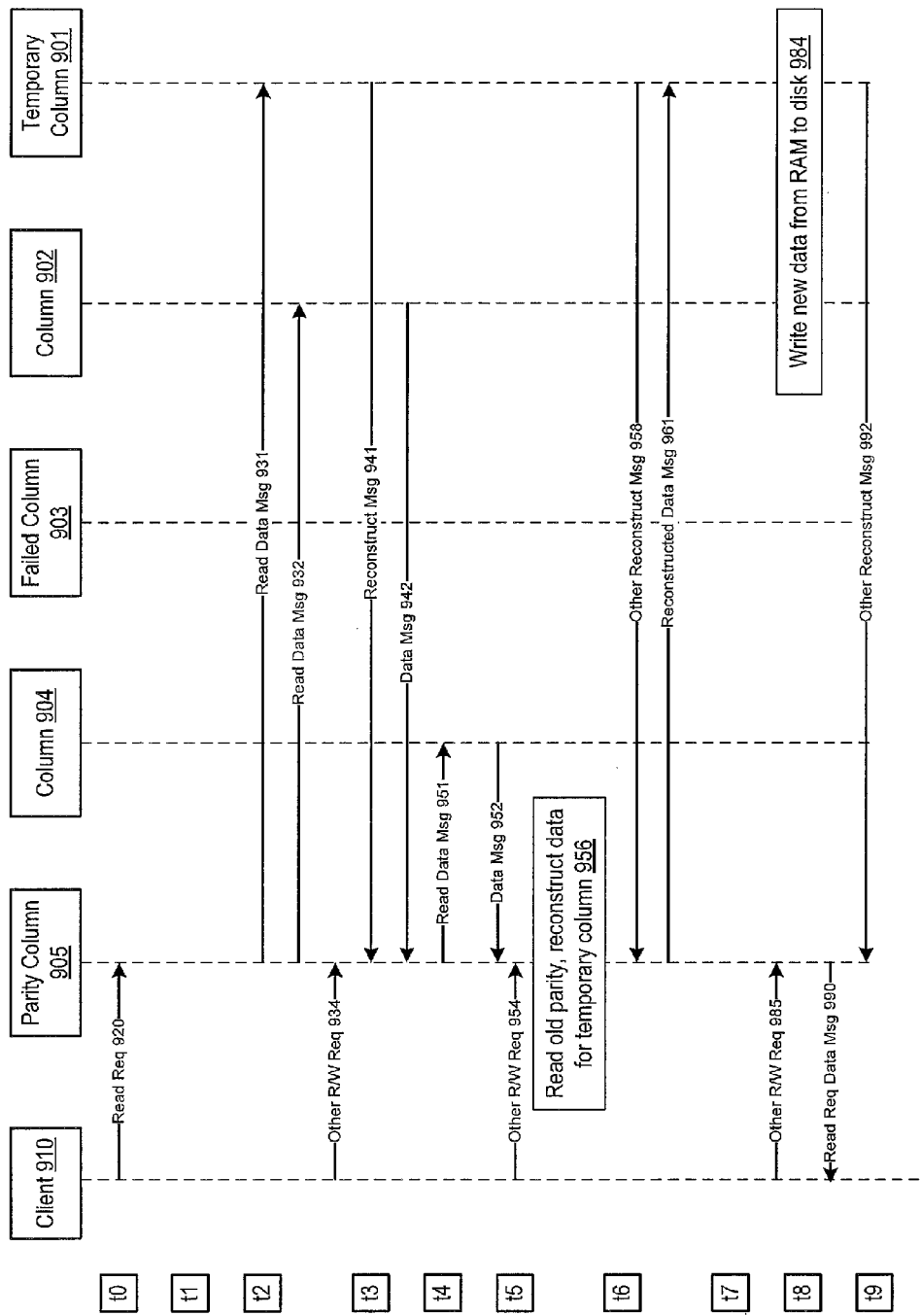
FIG. 5 is a sequence diagram illustrating one embodiment of read transaction between a client and a partial row in a RAID-5 layout with a failed component.

Turning now to FIG. 5, one embodiment of a sequence diagram for a read transaction between a client and a partial row in a RAID-5 layout with a failed component is shown. In the illustrated embodiment, a client 910 is shown requesting data from a row consisting of columns 902-904 and parity column 905. Here again, the data storage devices are referred to as columns 902-904 and the parity storage device is referred to as parity column 905. An array is formed with rows striped across the columns. Data storage locations within this array may be addressable by corresponding rows and columns 902-904. Here, only 3 columns used, whereas the previous two examples used 4 columns to form the array with a RAID-5 layout. As described earlier, in one embodiment, each column 901-904 may be a separate computer interconnected with other columns of the array via a network.

In this example, the data size is assumed to be less than the capacity of one row. At time t0, client 910 may send a read request to parity column 905 in message 920 to request data stored in each of columns 902 and 903. However, column 903 has previously failed and a temporary column 901 replaces it. A mapping stored in MDS 160 has been updated to reflect this change.

At time t2, parity column 905, knowing the existence of a temporary column (and therefore anticipating a possible reconstruction request), acquires the row lock in shared mode, after which it may begin a process of conveying a data read request message to each of columns 901 and 902 in messages 931 and 932, respectively. However, if this is a first read request to this data storage location within temporary column 901, then the corresponding data may need to be reconstructed. At time t3, parity column 905 may begin receiving data from column 902 and a reconstruction request from temporary column 901 in messages 941 and 942.

If a reconstruction request, such as 941 is received, at time t4, parity column 905 may send a read request message to all remaining columns (to reconstruct the failed column) such as message 951 to column 904 in this example. Subsequently, at time t5, each of the data columns may send a copy of the most recent data to parity column 905, such as message 952 from column 904. After receiving all the old data in columns other than the temporary column 901, parity column 905 may read the old parity and reconstruct the data corresponding to the data storage location in column 901 (block 956). In one embodiment, parity column 505 may send in message 961 the reconstructed data to temporary column 901 for storage. Similar to the forwarding of data for a write request, temporary column 901 may later store received data in its associated temporary storage device. In various embodiments, the temporary column 901 may or may not send an acknowledgment message to the parity column 505 acknowledging receipt of the reconstructed data in message 961.

At time t8, temporary column 901 may write the reconstructed data from its associated temporary storage device to its data storage location (block 984). Also, parity column 905 may send corresponding data from columns 902 and 903 (e.g. the data read from column 902 and the reconstructed data) to the client 910 with message 990. In another embodiment, the parity column 905 may not send the reconstructed data to the temporary column 901 for storage. The temporary column 901 may not later be determined to be a permanent replacement for failed column 903, so it may not be useful to fill its data storage locations with data.

As can be seen in FIG. 5, other read and write requests 934, 954, and 985 may occur while the array is servicing the request 920. The corresponding messages for requests 934, 954, and 985 are not shown in order to simplify the sequence diagram, but the corresponding messages and the buffering of corresponding data may be occurring during the servicing of request 920. In addition, in one embodiment, during the potential on-demand reconstruction to service read and write requests, temporary column 901 may begin a background thread in order to proactively reconstruct the data for the entire column, or all the rows in temporary column 901.

Temporary column 901 may send reconstruction messages to the parity column 905 as shown by messages 958 and 992 in FIG. 5. A reconstruction message may be sent for each row as described above. These reconstruction messages may be sent one at a time or multiple messages corresponding to a predetermined number of rows may be simultaneously sent. A key feature is other read and write requests, such as requests 934, 954, and 985, may be serviced during the proactive reconstruction. The parity column 905 may hold a reader-writer lock while reconstructing a row, whether the reconstruction is due to a read/write request or due to a proactive background thread. Since write requests acquire the lock in exclusive (or write) mode when there is a column failure, a write request will be blocked on the lock as it is already held for reconstruction, thus preventing a write from altering a data storage location within the row, while reading a column for currently held data to be used for reconstruction. Therefore, the reconstruction may be imperceptible to a software application, and is concurrent with other read/write requests.

If the failed component, such as column 903, is brought back online, then a new mapping table may be provided to illustrate the replacement of the temporary column 901 with the returned column 903. A proactive update for the returned column 903 may be begun, which the steps are further described below. Alternatively, the temporary column 901 may be selected as a permanent replacement. In one embodiment, this replacement may occur after a predetermined amount of time has elapsed. The now permanent column 901 may either begin or continue a proactive reconstruction process described above with background threads and messages. This proactive background reconstruction may occur simultaneously with the servicing of read and write requests from clients.

Figure 6:
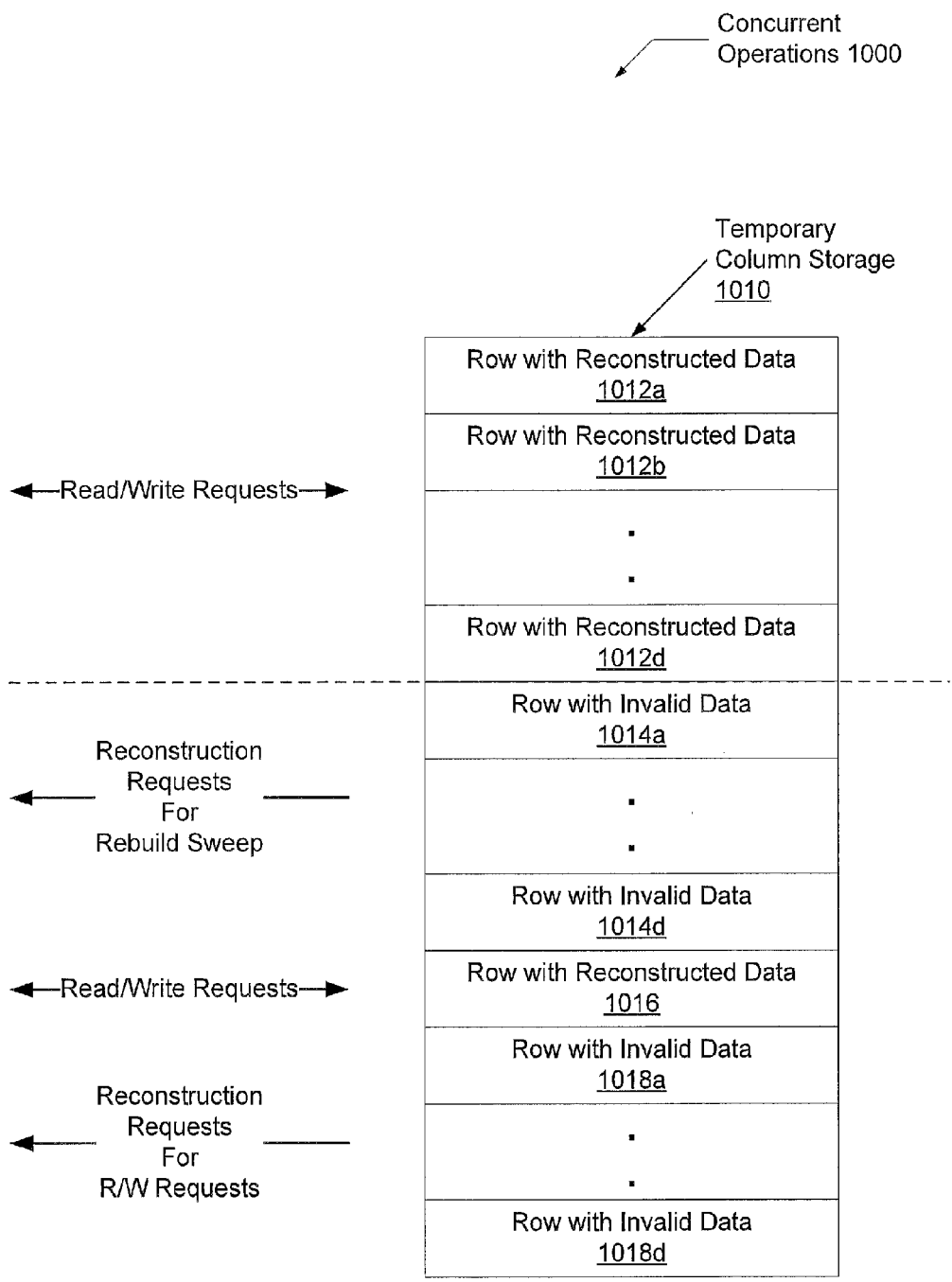
FIG. 6 is a generalized block diagram illustrating one embodiment of concurrent operations executing on a repairing component.

FIG. 6 illustrates concurrent operations 1000 may be ongoing in a component that is being repaired. Temporary column storage 1010, in one embodiment, illustrates the data storage locations of temporary column 901 in FIG. 5. In one embodiment, storage 1010 may be a temporary column performing a proactive background reconstruction while the array continues to service read and write requests from clients. In another embodiment, storage 1010 may now be an assigned permanent column performing the proactive background reconstruction while the array continues to service read and write requests from clients.

In the example shown, rows 1012a-1012d may already store data that has been reconstructed. As used herein, elements referred to by a reference numeral followed by a letter may be collectively referred to by the numeral alone. For example, rows 1012a-1012d may be collectively referred to as rows 1012. Rows 1014 may still hold no valid data, but one or more of rows 1014 may be sending messages for reconstruction to a corresponding parity column—or other column designated to receive such messages. Row 1016 may store reconstructed data as a result of a read request being simultaneously serviced as the background reconstruction continues. Rows 1018 may not have been provided with reconstructed data yet from either servicing a read or write request or from a background reconstruction request.

Figure 7:
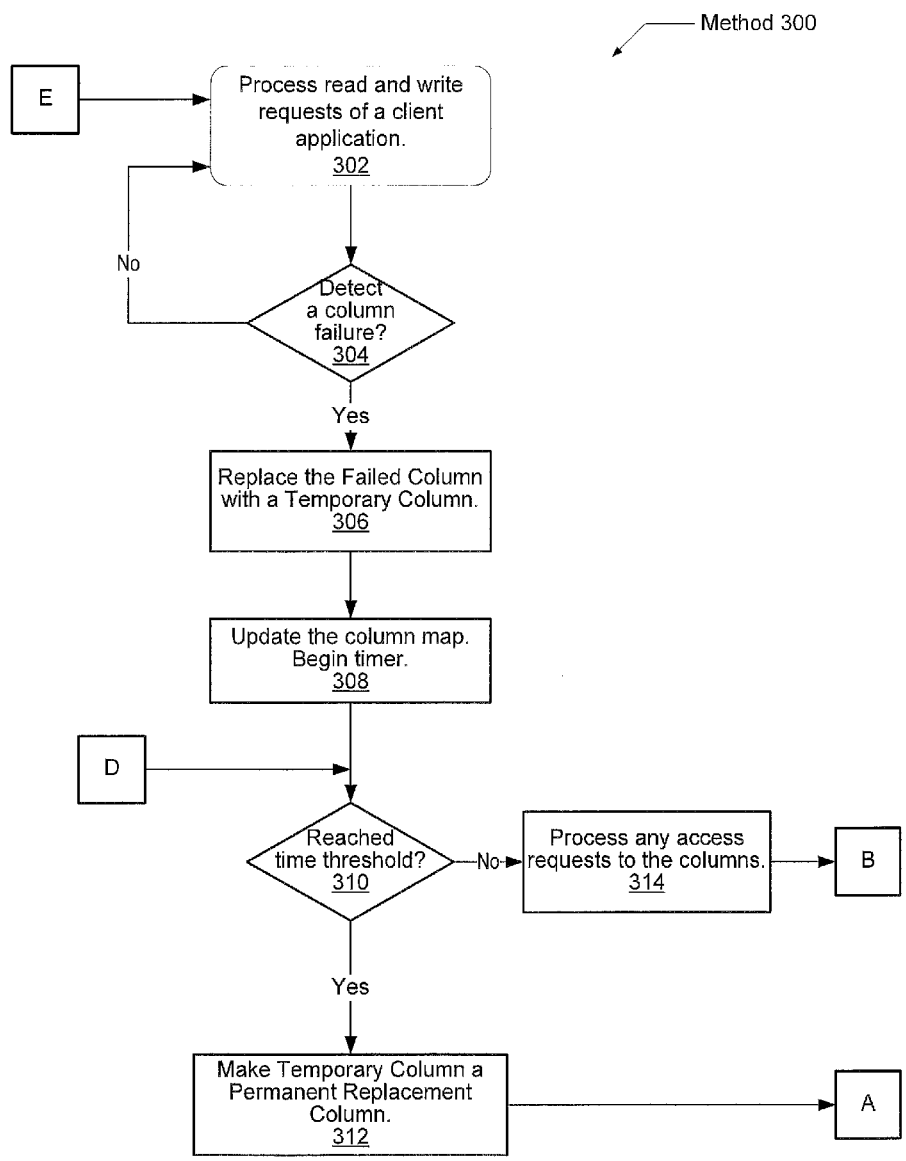
FIG. 7 is a generalized flow diagram illustrating one embodiment of a method for repairing a failed component within data storage subsystems without interruption of service.

Referring now to FIG. 7, one embodiment of a method 300 for repairing a failed component within data storage subsystems without interruption of service is shown. The components embodied in the computer system 100 described above may generally operate in accordance with method 300. For purposes of discussion, the steps in this embodiment are shown in sequential order. However, some steps may occur in a different order than shown, some steps may be performed concurrently, some steps may be combined with other steps, and some steps may be absent in another embodiment.

In one embodiment, a computer system may comprise a data storage cluster coupled to a client. The cluster may comprise a plurality of data storage locations addressable as rows and columns in an array. In one embodiment, the array may be configured as a RAID-5 layout. Each column of the array may comprise a separate computer of a plurality of computers interconnected to each other via a network. In block 302, a coordinating column may process read and write requests (e.g., generated by an application running on a client) for a particular row. In various embodiments, this coordinating column may also perform parity computations for the corresponding row. During a particular write, a client application may convey a partial stripe write request in which one or more columns of a particular row are not modified. In such a case, one or more bits within a particular column may not be modified since the write request corresponds to a data size less than the stripe size.

If a failure is detected for any column in the data storage cluster (conditional block 304), then in block 306 a temporary column is selected to temporarily take the place of the failed column. It is noted that a failure may be detected anywhere within the methods described herein and showing a detection in block 304 is for illustrative purposes only. In various embodiments, a temporary column may be a new computer or may be a disk within a computer that is already in the array. In block 308, a column map is updated to identify the column which temporarily replaces the failed column. This map may be stored in MDS 160 and provide a mapping between a given row and a corresponding coordinating column.

In one embodiment, storage devices in a data storage cluster may reside on different computers interconnected via a public network. In such an embodiment, one computer may be designated as a coordinating column for a particular row. This coordinating column may coordinate storage of data within other columns of the particular row and may also coordinate parity computation. Client 110 may direct read and write operations to the coordinating column for a given row. Subsequent to failure of a column, a timer or counter may begin incrementing in order to measure an amount of time the failed column has been offline. If the timer reaches a predetermined threshold (conditional block 310), then control flow of method 300 moves to block 312 where the temporary column is made a permanent replacement for the failed column. Method 300 then moves to block A and method 800 of FIG. 10 where a further description is provided for the steps of making the temporary column a permanent replacement for the failed column. Otherwise, control flow of method 300 moves to block 314 where any access requests to any columns including the temporary column are processed. Method 300 then moves to block B and method 400 of FIG. 8 where a further description is provided for the steps in handling any access requests.

Figure 8:
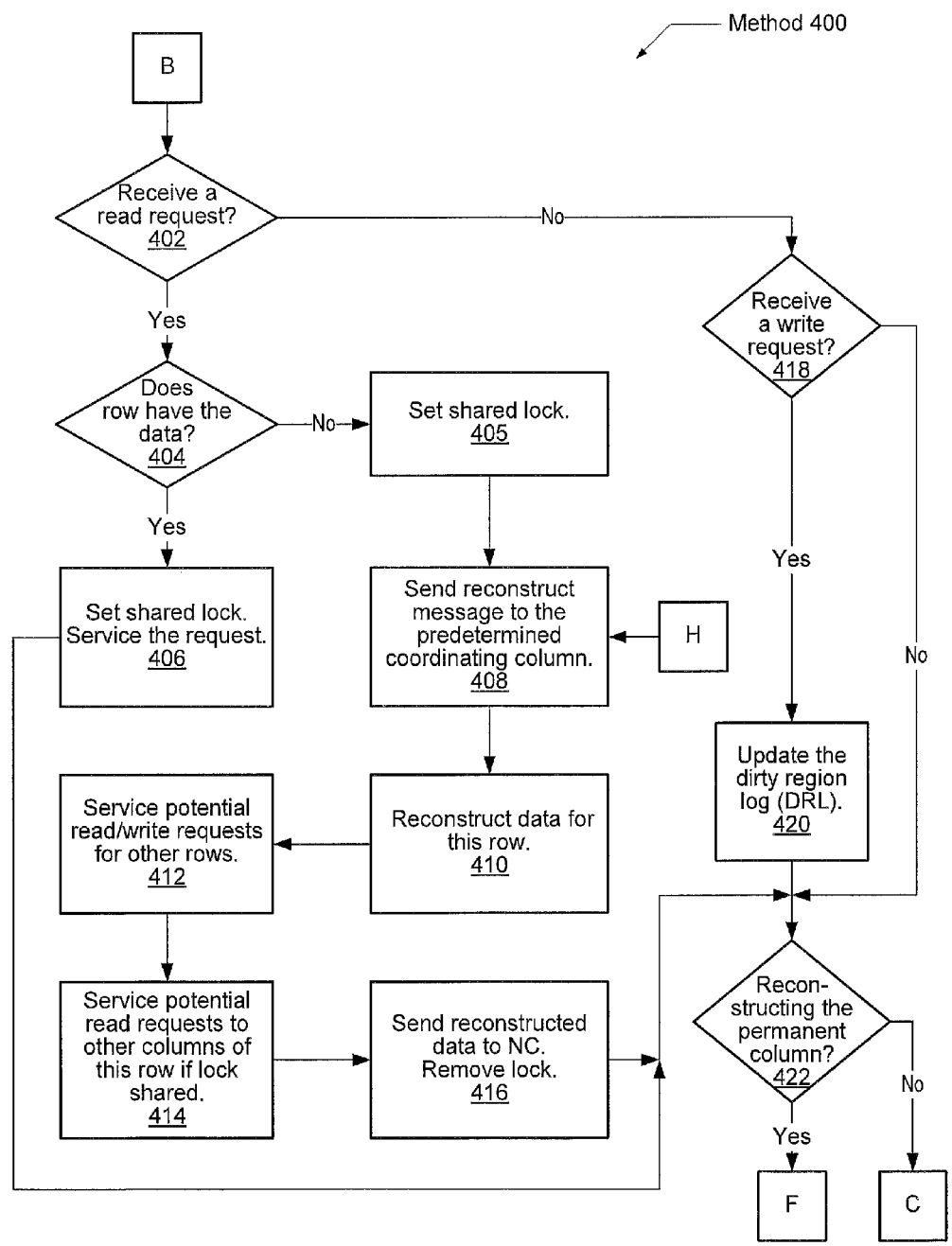
FIG. 8 is a generalized flow diagram illustrating one embodiment of a method for continuing repairing a failed component within data storage subsystems without interruption of service.

Turning now to FIG. 8, one embodiment of a method 400 for repairing a failed component within data storage subsystems without interruption of service within computer systems is shown. Similar to all methods described herein, the steps in this embodiment are shown in sequential order. However, some steps may occur in a different order than shown, some steps may be performed concurrently, some steps may be combined with other steps, and some steps may be absent in another embodiment.

In order to arrive at block B, a column within a data storage cluster has failed, but a predetermined amount of time has not yet elapsed. Therefore, the failed column may still come back online. If a read request is received from the client by the data storage cluster (conditional block 402), and a corresponding row has the data (conditional block 404), then in block 406, the cluster services the request. The row may have the requested data despite a failed column. In one example, the read request is for data stored in the row corresponding to columns other than the failed column. In another example, the read request is for data stored in the failed column, and the failed column has the data due to a previous reconstruction of the data.

A coordinating column specified by the column/device map (which may be stored in the MDS 160) may receive the read request. The coordinating column may receive a read request that corresponds to an entire row, or less than an entire row. The coordinating column may forward read messages to one or more corresponding target columns within the row, wherein a target column corresponds to a location specified by the read request. Depending on the read request, one or more columns may not receive a message as they are not targeted by the read request.

In one embodiment, if the temporary column or the previously failed column is not fully online yet, then the coordinating column may place a reader-writer lock on the entire row. When the coordinating column receives all of the corresponding data from the target columns, it may forward the data to the client and remove the reader-writer lock on the row. As discussed above, the temporary column may be designated a permanent column after the counter has reached a predetermined threshold value as shown in blocks 310 and 312 of FIG. 7. If the temporary column has not been assigned as a permanent replacement column, and therefore the permanent column is not being reconstructed (conditional block 422), then a determination is made whether or not the previously failed column has returned. This determination is further described in method 700 of FIG. 9. Control flow of method 400 then moves to block C and method 700 of FIG. 9. Otherwise, if the temporary column has been assigned as a permanent replacement column, and is being reconstructed (conditional block 422), then reconstruction continues as described in method 800 of FIG. 10. Control flow of method 400 moves to block F and method 800 of FIG. 10. For method 400, coming from block 406, the temporary column has not been assigned as a permanent replacement column, and therefore the permanent column is not being reconstructed. Therefore, control flow of method 400 moves to block C and method 700 of FIG. 9 where a determination is made whether or not the previously failed column has returned.

If a read request is received from the client by the data storage cluster (conditional block 402), and a corresponding row does not have the data (conditional block 404), then control flow moves to block 405 where the corresponding unit in the temporary column and the selected row is prepared to be reconstructed. As described above, a coordinating column specified by the device map may receive the read request. Responsive to a read request, the coordinating column may forward corresponding read messages to one or more target columns within the row, wherein a target column corresponds to locations targeted by the read request. One or more columns within the row may not receive a message as they are not specified by the read request to supply data. In addition, the coordinating column may place a reader-writer lock on the entire corresponding row.

When a temporary column receives a read message for data it does not contain, in block 408, this target column sends a reconstruction message to the coordinating column. In addition, block 408 may be reached during reconstruction of the temporary column which has been assigned as the new permanent column. This assignment may be made in response to a timer reaching a predetermined threshold value as tested in conditional block 310 of FIG. 7. In such a case, block 408 is reached via block H. This case is further described later. Regardless of how block 408 is reached, the following steps to perform reconstruction of a row are the same. Again, the coordinating column has placed a reader-writer lock on the row, which may be in anticipation of a reconstruction request. Write operations may be blocked by the reader-writer lock for the entire row. The coordinating column may send read messages to non-target columns in order to obtain stored data values for each column in the row other than itself and the temporary column. Using the previously stored full parity value for the row and the stored data values from the other columns, the coordinating column may reconstruct the data value that would be stored in the temporary column if there had been no failure.

A simple example similar to the sequence diagram shown in FIG. 5 is now provided for illustrative purposes. A data storage cluster may comprise 4 computers interconnected in a network and the cluster may comprise a RAID-5 layout. The 4 computers may be designated columns 0 to 3. For a read request from a client coupled to the data storage cluster, a corresponding row for the request may have column 3 designated as a coordinating column. The read request may be targeted to read only data stored in columns 0 and 1. The current data stored in columns 0, 1, and 2 may be designated as A, B, and C, respectively. However, column 1 may have failed and may need to be removed from the network for possible repair. In one embodiment, a temporary column, such as a $5^{th}$ different computer, may be inserted into the network. Alternatively, the temporary column may comprise extra or spare storage capacity on one or more columns already in the network. Based on the newly assigned temporary column, a new mapping may be generated which designates the temporary column (e.g., the new $5^{th}$ computer) as column 1. New mappings are provided to clients for use in targeted further storage access requests. Initially, the temporary column has no reconstructed data.

Continuing with the simple example described above that is similar to the sequence diagram shown in FIG. 5, in one embodiment, coordinating column 3 may place a reader-writer lock on the row that corresponds to the write requests. Coordinating column 3 may send a read message to column 0 and newly designated column 1 (i.e., the temporary column). Column 0 may send data A to column 3. Column 1, which does not have the data, may send a reconstruct message to coordinating column 3. In response to the reconstruct message, coordinating column 3 sends a read message to column 2 and column 2 may send the data C to column 3. Coordinating column 3 may already store a corresponding parity value for the entire row, which may be (A+B+C), where "+" indicates a bit-wise binary exclusive-or operation. Coordinating column 3 may then reconstruct data for temporary column 1, which in one embodiment may comprise the following: A+C+(A+B+C)=B. Column 3 may send the data A and B to the client. In various embodiments, column 3 may or may not send the data B to temporary column 1 for storage.

Returning to method 400, in block 412, the data storage cluster may simultaneously service read and write requests to other rows as the initial read request progresses. Also, in block 414, other read requests to this same row may simultaneously be serviced since the lock is a reader-writer lock. Write requests to this same row, however, are blocked. After the coordinating column reconstructs the data, in block 416, the column sends the data to the temporary column and it removes the reader-writer lock. If the temporary column has not been assigned as a permanent replacement column, and therefore the permanent column is not being reconstructed, (conditional block 422), then a determination is made whether or not the previously failed column has returned. This determination is further described in method 700 of FIG. 9. Control flow of method 400 moves to block C and method 700 of FIG. 9.

If a read request is not received from the client by the data storage cluster (conditional block 402), but a write request is received (conditional block 418), then in block 420, the write request information may be stored in a corresponding dirty region map, or dirty region log (DRL). The data itself is not necessarily stored in the DRL, since the data may be reconstructed later if needed.

Figure 9:
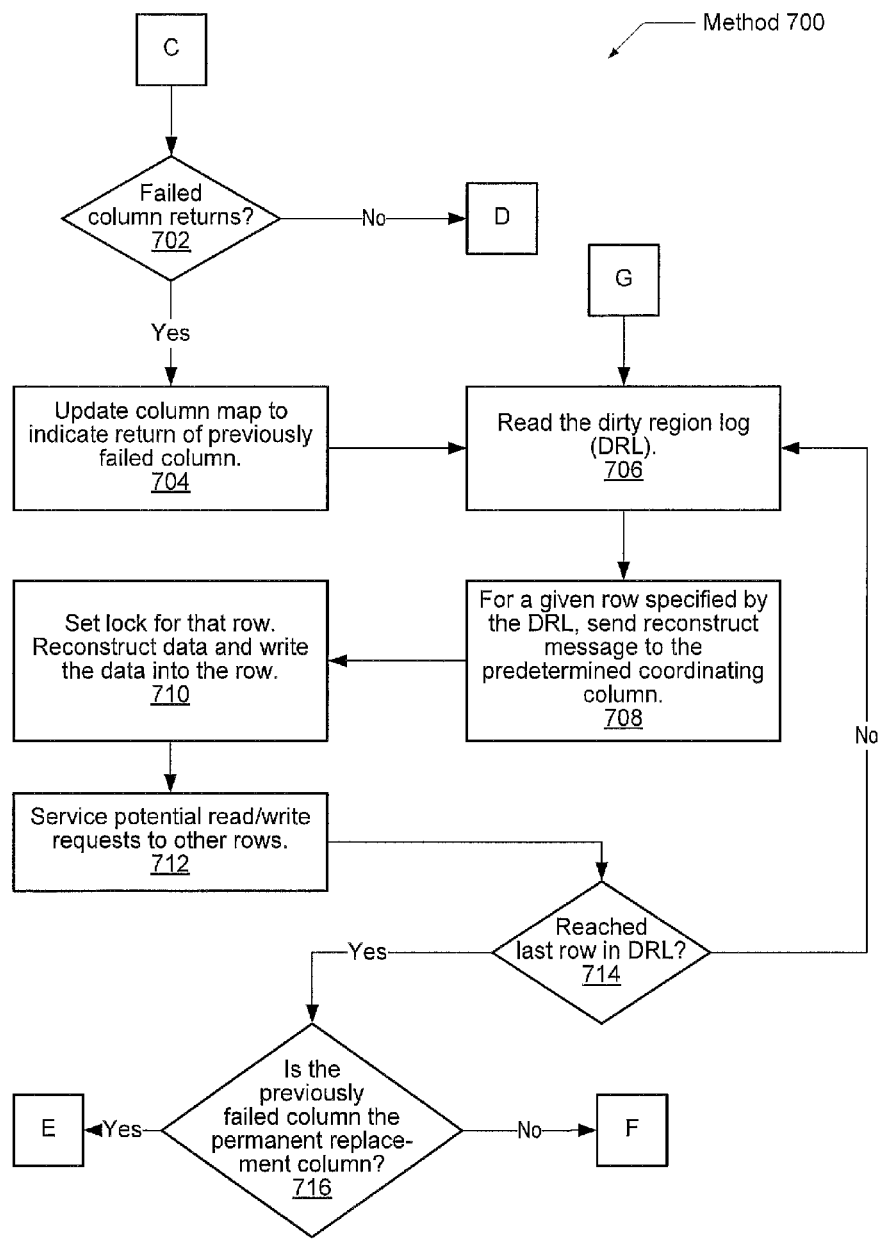
FIG. 9 is a generalized flow diagram illustrating one embodiment of a method for continuing repairing a failed component within data storage subsystems without interruption of service.

Turning now to FIG. 9, one embodiment of a method 700 for continuing repair of a failed component within data storage subsystems without interruption of service is shown. In order to arrive at block C, read and write requests are being serviced while a column within the cluster is offline and a permanent column to replace the failed column has not yet been designated. If the previously failed column is not yet brought back online (conditional block 702), then control flow of method 700 moves to block D and returns to method 300 of FIG. 7. Otherwise, in block 704, the device map may be updated to designate the previously failed column as being part of the cluster again.

In block 706, the corresponding DRL, which may be stored in the previous temporary column, is read. As discussed above, write updates that occurred while the returned column was offline are stored in the DRL. For each entry in the DRL, in block 708, a background thread may be generated in order to send a reconstruct request to a corresponding coordinating column. In blocks 710 and 712, the coordinating column may place a reader-writer lock on a corresponding row and perform data reconstruction as described above regarding blocks 408-416 of method 400. If the last entry of the DRL is reached (conditional block 714) and the previously failed column has returned and accordingly is designated as the permanent replacement column (conditional block 716), then control flow of method 700 moves to block E and returns to method 300 of FIG. 7. Here, the previously failed column does not need full reconstruction. The previously failed column only needs reconstruction for write operations that occurred while this column was offline. These write operations are recorded in the dirty region log. If the previously failed column has not returned and accordingly is not designated as the permanent replacement column (conditional block 716), then the temporary column is designated as the permanent replacement column and reconstruction of this permanent column continues in method 800 of FIG. 10. Control flow of method 700 moves to block F and method 800 of FIG. 10.

Figure 10:
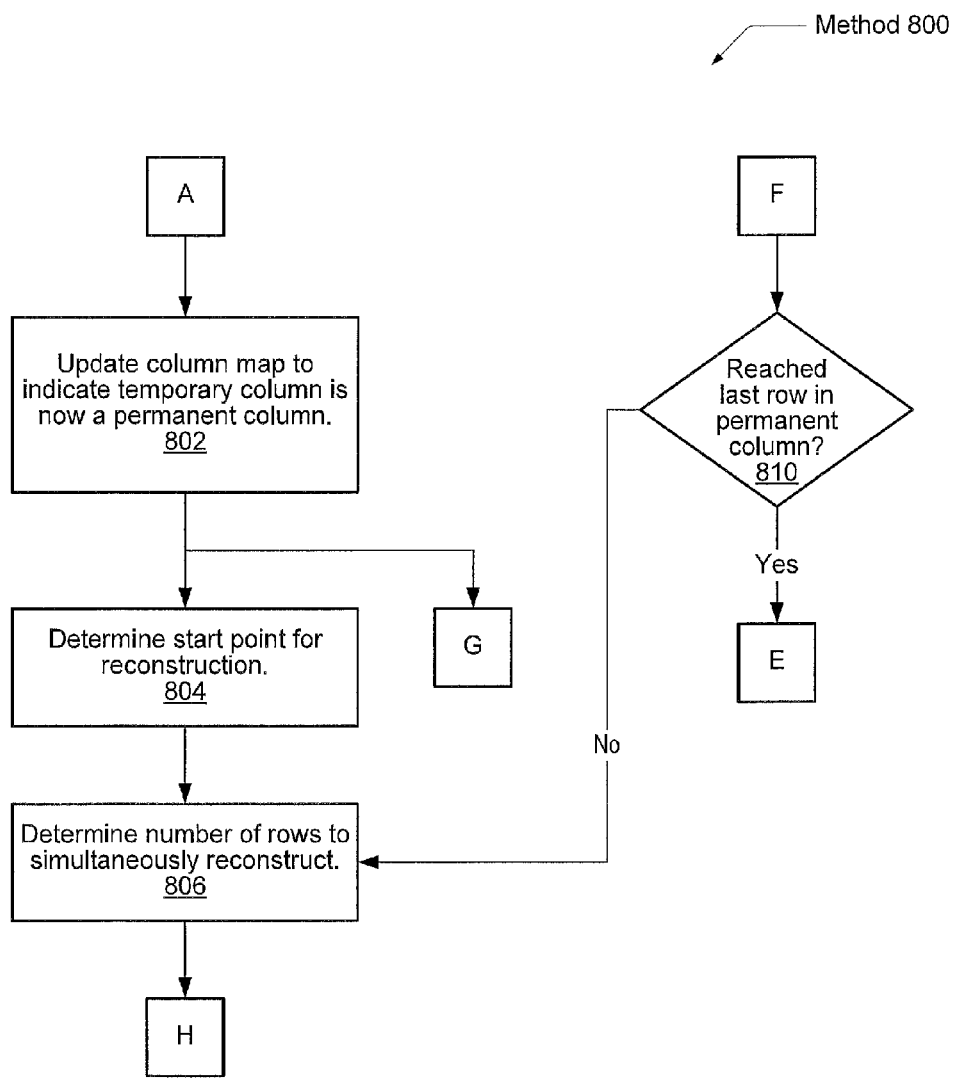
FIG. 10 is a generalized flow diagram illustrating one embodiment of a method for continuing repairing a failed component within data storage subsystems without interruption of service.

Referring now to FIG. 10, one embodiment of a method 800 for continuing repair of a failed component without interruption of service is shown. In order to arrive at block A, the counter/timer measuring the time elapsed since a column failed has reached a predetermined threshold. Therefore, the failed column may not be brought back online at this time and the temporary column may be assigned as a permanent column in the data storage cluster. In block 802, the device/column map is updated to show the temporary column is now a permanent column. Also, state tables in each of the other columns may be updated.

Rather than have the entire new permanent column be reconstructed as a result of read misses, a background sweep of background threads may be generated to perform reconstruction while the new permanent column remains online and services read and write requests from a client application. In block 804, a starting point for the background sweep may be determined, such as the top or bottom of the memory, as determined by address values, within a corresponding computer. In block 806, a number of rows to simultaneously reconstruct with background threads may be determined. Then control flow of method 800 moves to block H and to method 400 of FIG. 8. In order to arrive at block F in method 800, the previously failed column is not designated as the permanent replacement column. In other words, the temporary column has been designated as the permanent replacement column and a reconstruction sweep is occurring on the permanent replacement column. If a new permanent column has finished a reconstruction sweep (conditional block 810), then control flow of method 800 moves to block E and method 300 of FIG. 5. Otherwise, control flow of method 800 moves to block 806.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer system comprising:
a client configured to convey read and write requests; and
a data storage cluster coupled to receive the read and write requests, wherein the data storage cluster comprises a plurality of data storage locations addressable as rows and columns in an array;
wherein in response to detecting a failure of a first column, the data storage cluster is configured to:
designate a second column as a replacement for the first column;
initiate reconstruction of first data stored in the first column; and
store reconstructed data corresponding to the first data in the second column;
wherein the data storage cluster is further configured to service received read and write requests during said reconstruction, whereby read data is returned to clients responsive to received read requests and/or write data is written to the array responsive to received write requests; and
wherein during said reconstruction, the data storage cluster is further configured to store information corresponding to a write request targeted to the second column in a temporary log.

2. The system as recited in claim 1, wherein each column of the array comprises a separate computer interconnected with other columns of the array via a network.

3. The system as recited in claim 1, wherein during said reconstruction, the data storage cluster is further configured to:
receive a read request targeted to a given row; and
service columns targeted by the read request, except for the second column.

4. The system as recited in claim 3, wherein the data storage cluster is further configured to designate the second column as a permanent replacement for the first column.

5. The system as recited in claim 4, wherein the data storage cluster is further configured to designate the second column as the permanent replacement in response to detecting a predetermined amount of time has elapsed after detecting the failure of the first column.

6. The system as recited in claim 1, wherein the data storage cluster is further configured to convey a write completion indication that corresponds to a received write request to the client, wherein said write completion indication is conveyed prior to completing performance of the write request in the array.

7. The system as recited in claim 6, wherein the write request corresponds to a chosen particular row and one or more particular columns of the array, and wherein the data storage cluster is further configured to:
read old data only from storage locations targeted by the write request;
compute a new parity value for the chosen row based upon the old data, data that corresponds to the write request, and a stored old parity value corresponding to the old data.

8. A method comprising:
receiving read and write requests from a client in a data storage cluster, wherein the data storage cluster comprises a plurality of data storage locations addressable as rows and columns in an array;

in response to detecting a failure of a first column:
- designating a second column as a replacement for the first column;
- initiating reconstruction of first data stored in the first column; and
- storing reconstructed data corresponding to the first data in the second column;

servicing received read and write requests during said reconstruction, whereby read data is returned to clients responsive to received read requests and/or write data is written to the array responsive to received write requests; and storing information corresponding to a write request targeted to the second column in a temporary log during said reconstruction.

9. The method as recited in claim 8, wherein each column of the array comprises a separate computer interconnected with other columns of the array via a network.

10. The method as recited in claim 8, wherein during said reconstruction, the method further comprises:
- receiving a read request targeted to a given row; and
- servicing columns targeted by the read request, except for the second column.

11. The method as recited in claim 10, further comprising designating the second column as a permanent replacement for the first column.

12. The method as recited in claim 11, further comprising designating the second column as the permanent replacement in response to detecting a predetermined amount of time has elapsed after detecting the failure of the first column.

13. The method as recited in claim 8, further comprising conveying a write completion indication that corresponds to a received write request to the client, wherein said write completion indication is conveyed prior to completing performance of the write request in the array.

14. The method as recited in claim 13, wherein the array comprises a redundant array of independent disks (RAID) 5 layout.

15. A computer-readable storage medium storing program instructions that are executable to:
- receive read and write requests from a client in a data storage cluster, wherein the data storage cluster comprises a plurality of data storage locations addressable as rows and columns in an array;
- in response to detecting a failure of a first column:
  - designate a second column as a replacement for the first column;
  - initiate reconstruction of first data stored in the first column; and
  - store reconstructed data corresponding to the first data in the second column;
- service received read and write requests during said reconstruction, whereby read data is returned to clients responsive to received read requests and/or write data is written to the array responsive to received write requests; and
- store information corresponding to a write request targeted to the second column in a temporary log during said reconstruction.

16. The computer-readable storage medium as recited in claim 15, wherein during said reconstruction, the program instructions are further executable to:
- receive a read request targeted to a given row; and
- service columns targeted by the read request, except for the second column.

17. The computer-readable storage medium as recited in claim 15, wherein the program instructions are further executable to convey a write completion indication that corresponds to a received write request to the client, wherein said write completion indication is conveyed prior to completing performance of the write request in the array.

18. The computer-readable storage medium as recited in claim 15, wherein the program instructions are further executable to designating the second column as a permanent replacement for the first column in response to detecting a predetermined amount of time has elapsed after detecting the failure of the first column.

* * * * *